(12) United States Patent
Srinivasa et al.

(10) Patent No.: US 10,038,996 B1
(45) Date of Patent: Jul. 31, 2018

(54) USER GROUP SELECTION IN MULTIPLE USER MULTIPLE INPUT MULTIPLE OUTPUT (MU-MIMO) CONFIGURATIONS

(71) Applicant: MARVELL INTERNATIONAL LTD., Hamilton (BM)

(72) Inventors: Sudhir Srinivasa, Campbell, CA (US); Hongyuan Zhang, Fremont, CA (US); Yakun Sun, Sunnyvale, CA (US); Yan Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 203 days.

(21) Appl. No.: 14/327,298

(22) Filed: Jul. 9, 2014

Related U.S. Application Data (60) Provisional application No. 61/844,343, filed on Jul. 9, 2013.

(51) Int. Cl.
| | | |
|---|---|---|
| *H04W 4/00* | (2018.01) | |
| *H04W 8/18* | (2009.01) | |
| *H04B 7/0452* | (2017.01) | |

(52) U.S. Cl.
CPC .......... *H04W 8/186* (2013.01); *H04B 7/0452* (2013.01)

(58) Field of Classification Search
CPC .................................................... H04W 28/04
USPC ........................................................ 370/329
See application file for complete search history.

(56) References Cited

U.S. PATENT DOCUMENTS

| | | | |
|---|---|---|---|
| 6,862,440 | B2 | 3/2005 | Sampath |
| 7,206,354 | B2 | 4/2007 | Wallace et al. |
| 7,486,740 | B2 | 2/2009 | Inanoglu |
| 7,729,439 | B2 | 6/2010 | Zhang et al. |
| 8,155,138 | B2 | 4/2012 | van Nee |
| 8,270,909 | B2 | 9/2012 | Zhang et al. |
| 8,526,351 | B2 | 9/2013 | Fischer et al. |

(Continued)

OTHER PUBLICATIONS

IEEE Std 802.3ac-1998, "IEEE Standard for Information technology—Telecommunications and information exchange between systems—Local and metropolitan area networks—Specific requirements, Supplement to Carrier Sense Multiple Access with Collision Detection (CSMA/CD) access method and physical layer specifications—Frame Extensions for Virtual Bridged Local Area Network (VLAN) Tagging on 802.3 Networks," *The Institute of Electrical and Electronics Engineers, Inc.*, pp. 1-19 (Sep. 16, 1998).

(Continued)

*Primary Examiner* — Christopher R Crompton (57) ABSTRACT

A method in a communication network includes obtaining descriptions of a plurality of communication channels. Each communication channel is associated with a different one of a plurality of receivers. The method also includes identifying, based on the descriptions of the plurality of communication channels, two or more communication channels that satisfy one or more predetermined constraints related to orthogonality between the two or more communication channels. The method further includes selecting, to be included in a group of receivers, receivers associated with the two or more identified communication channels. The method additionally includes transmitting, to the group of receivers, at least one data unit that includes data intended for each receiver in the group.

22 Claims, 4 Drawing Sheets

(56) References Cited

U.S. PATENT DOCUMENTS

| | | | |
|---|---|---|---|
| 8,675,755 B1 | 3/2014 | Lee et al. | |
| 8,724,720 B2 | 5/2014 | Srinivasa et al. | |
| 2001/0053139 A1* | 12/2001 | Zimmermann | H04W 36/06 370/332 |
| 2006/0063492 A1 | 3/2006 | Iacono et al. | |
| 2009/0067382 A1* | 3/2009 | Li | H04L 5/0037 370/330 |
| 2009/0154419 A1* | 6/2009 | Yoshida | H04L 5/0023 370/330 |
| 2009/0196163 A1 | 8/2009 | Du | |
| 2011/0002219 A1 | 1/2011 | Kim et al. | |
| 2011/0096796 A1 | 4/2011 | Zhang et al. | |
| 2011/0103280 A1 | 5/2011 | Liu et al. | |
| 2011/0111760 A1* | 5/2011 | Bevan | H04B 7/0452 455/450 |
| 2011/0310827 A1 | 12/2011 | Srinivasa et al. | |
| 2012/0039196 A1 | 2/2012 | Zhang | |
| 2012/0276885 A1* | 11/2012 | Bacelli | H04B 1/0475 455/418 |
| 2013/0287131 A1* | 10/2013 | Hart | H04L 25/03898 375/267 |
| 2015/0016379 A1* | 1/2015 | Nam | H04B 7/0456 370/329 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-91 (Sep. 1999).
IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).
IEEE Std 802.11g/D8.2, Apr 2003 (Supplement to ANSI/IEEE Std 802.11, 1999 (Reaff 2003)) "Draft Supplement to Standard [for] Information technology—Telecommunications and information exchange between systems—Local and metropolitan area networks-Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).
Chen, "Home Network Basis: Transmission Environments and Wired/Wireless Protocols," *Prentice Hall*, pp. 1-26 (Jul. 2003).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Hiertz, et al., "The IEEE 802.11 Universe," *IEEE Communications Magazine*, pp. 62-70, (Jan. 2010).
Love et al., "An Overview of Limited Feedback in Wireless Communication Systems," IEEE J. on Selected Areas in Communications, vo. 26, No. 8, pp. 1341-1365 (Oct. 2008).
Perahia, et al., "Gigabit Wireless LANs: an overview of IEEE 802.11ac and 80211 ad," ACM SIGMOBILE Mobile Computing and Communications Review, vol. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Zhang et al., "11ac Explicit Sounding and Feedback", *The Institute of Electrical and Electronics Engineers*, doc. No. IEEE 802.11-10/1105r0, 44 pages (Sep. 2010).

(56) References Cited

OTHER PUBLICATIONS

U.S. Appl. No. 12/940,778, "Method and Apparatus for Decoding Independently Encoded Signals," filed Nov. 5, 2010.

* cited by examiner

USER GROUP SELECTION IN MULTIPLE USER MULTIPLE INPUT MULTIPLE OUTPUT (MU-MIMO) CONFIGURATIONS

CROSS-REFERENCE TO RELATED APPLICATION

This application claims the benefit of the U.S. Provisional Patent Application No. 61/844,343, filed on Jul. 9, 2013, the entire disclosure of which is hereby incorporated by reference herein.

FIELD OF THE DISCLOSURE

The present disclosure relates generally to communication networks and, more particularly, to wireless networks that utilize multi-user communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. A relatively new standard, IEEE 802.11ac defines operation in the 5 GHz bands overlapping with legacy IEEE 802.11a/n systems, and promises throughputs exceeding 6.9 Gbps. Unlike the other standards, the 802.11ac Standard allows simultaneous communication from an access point to multiple different client stations.

SUMMARY

In an embodiment, a method in a communication network includes obtaining descriptions of a plurality of communication channels, wherein each communication channel is associated with a different one of a plurality of receivers. The method also includes identifying, based on the descriptions of the plurality of communication channels, two or more communication channels, of the plurality of communication channels, that satisfy one or more predetermined constraints related to orthogonality between the two or more communication channels. The method further includes selecting, to be included in a group of receivers, receivers associated with the two or more identified communication channels. The method additionally includes transmitting, to the group of receivers, at least one data unit that includes data intended for each receiver in the group.

In another embodiment, an apparatus comprises a network interface device configured to obtain descriptions of a plurality of communication channels, wherein each communication channel is associated with a different one of a plurality of receivers. The network interface device is also configured to identify, based on the descriptions of the plurality of communication channels, two or more communication channels, of the plurality of communication channels, that satisfy one or more predetermined constraints related to orthogonality between the two or more communication channels. The network interface device is additionally configured to select, to be included in a group of receivers, receivers associated with the two or more identified communication channels. The network device is further configured to transmit, to the group of receivers, at least one data unit that includes data intended for each receiver in the group.

DETAILED DESCRIPTION

In embodiments described below, a wireless network device such as an access point (AP) of a wireless local area network (WLAN) transmits independent data streams to multiple client stations simultaneously via an antenna array. To mitigate interference at a receiving station due to simultaneous transmissions from the AP to one or more other stations, the AP intelligently and efficiently selects client stations, among a plurality of candidate client stations, to be included in a group of client stations to which the AP is to transmit data simultaneously. In an embodiment, the AP selects the client stations using descriptions of the wireless communication channels between the AP and each of the candidate client stations. In an embodiment, the AP selects client stations associated with orthogonal, or nearly orthogonal, communication channels between the AP and the client stations. As a result, in this embodiment, multiple client stations that simultaneously receive signals from the AP 14 receive the signals via orthogonal, or nearly orthogonal, communication channels. Simultaneous transmission via orthogonal, or nearly orthogonal, communication channels mitigates interference at a receiving device caused by signals intended to the other receiving devices, while also maximizing signal power (e.g., maximizing signal to noise ratio) at the receiving device of the signal intended for the receiving device, in at least some embodiments. In at least some embodiments, client station selection techniques of the present disclosure allow the AP to select the client stations relatively quickly and efficiently by using relatively low complexity computations, as will be described in more detail below.

Figure 1:
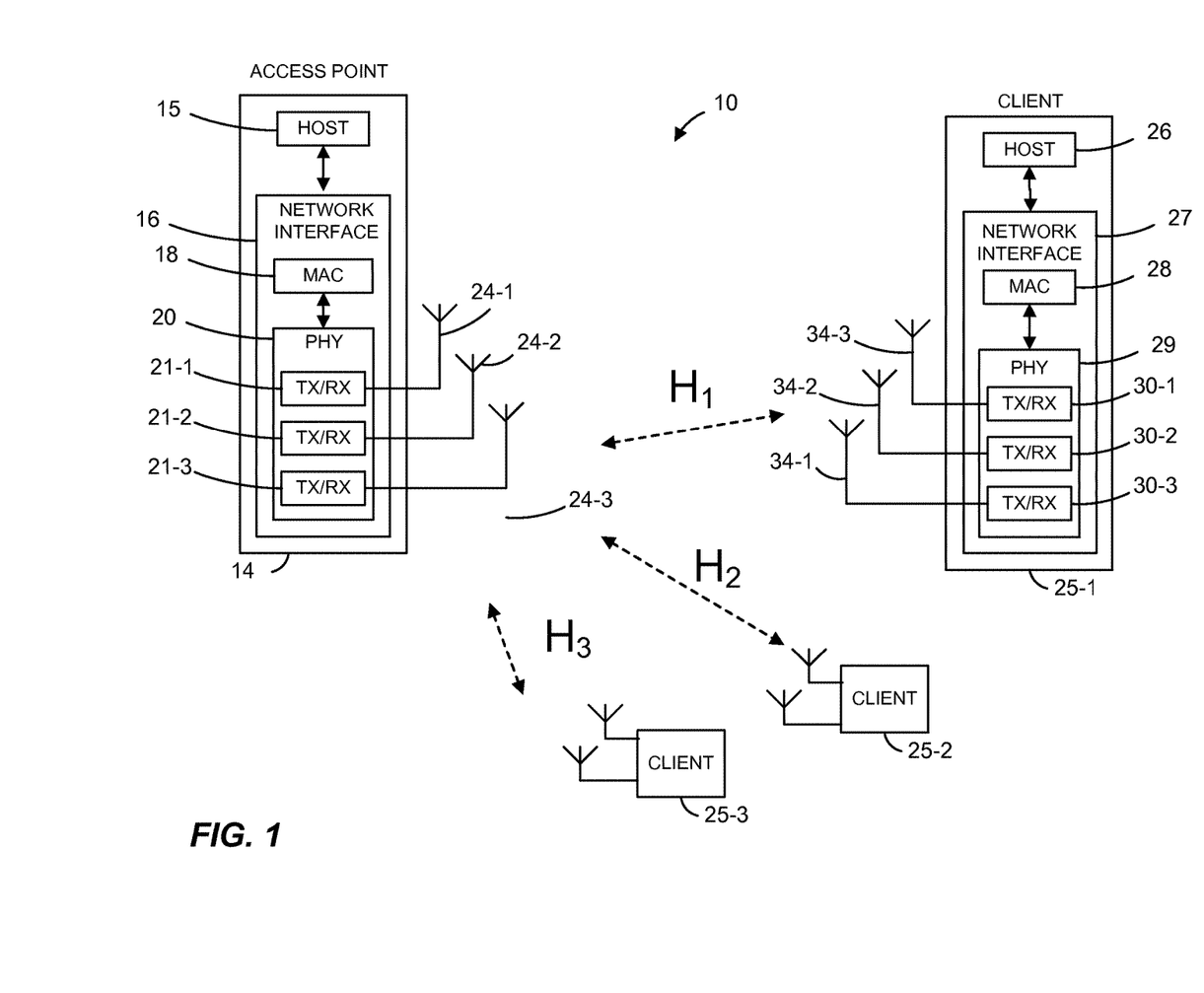
FIG. 1 a block diagram of an example wireless local area network (WLAN) in which user selection techniques of the present disclosure are utilized, according to an embodiment.

FIG. 1 is a block diagram of an example wireless local area network (WLAN) 10, according to an embodiment. In an embodiment, the WLAN 10 supports downlink (DL) multiuser (MU) multiple-input and multiple-output (MIMO)

communication between an AP 14 and a plurality of client stations 25. Additionally, the WLAN 10 in at least some of the embodiments supports DL single-user (SU) communication between the AP 14 and each of the plurality of client stations 25. In an embodiment, when using MU communication, the AP 14 simultaneously transmits independent data streams to a group of two or more of the client stations 25. In at least some implementations, the AP 14 and at least some of the stations 25 support MU transmission mode in which a communication frame is communicated to a particular group of client stations 25. A communication frame transmitted to a group of stations (hereinafter, an "MU group," or simply "group") can include client-specific portions simultaneously transmitted using different spatial streams or space-time streams, in an embodiment. In at least some of the embodiments, each communication frame is a data unit that includes a respective physical layer (PHY) preamble.

The AP 14 includes a host processor 15 coupled to a network interface device 16. The network interface device 16 includes a medium access control (MAC) processing unit 18 and a physical layer (PHY) processing unit 20. The PHY processing unit 20 includes $N_T$ transceivers 21, and the transceivers are coupled to $N_T$ antennas 24. Although three transceivers 21 and three antennas 24 are illustrated in FIG. 1 (i.e., $N_T$=3), the AP 14 can include a different number (e.g., $N_T$=2, 4, 5, 6, 7, 8, etc.) of transceivers and antennas in other embodiments.

With continued reference to FIG. 1, each station 25-*i* is equipped with a respective number of antennas. Although three client stations 25 are illustrated in FIG. 1, the WLAN 10 can include a different number (e.g., 1, 2, 4, 5, 6, etc.) of client stations in various scenarios and embodiments. In an embodiment, a client station 25-1 includes a host processor 26 coupled to a network interface device 27. The network interface device 27 includes a MAC processing unit 28 and a PHY processing unit 29. The PHY processing unit 29 includes $N_1$ transceivers 30, and the $N_1$ transceivers 30 are coupled to $N_1$ antennas 34. Although three transceivers 30 and three antennas 34 are illustrated in FIG. 1 (i.e., $N_1$=3), the client station 25-1 can include a different number of transceivers and antennas (e.g., $N_1$=1, 2, 4, 5, etc.) in other embodiments. The client stations 25-2 and 25-3 have a structure that is the same as or generally similar to the client station 25-1, in an embodiment. In an embodiment, each of the client stations 25-2 and 25-3 is structured like the client station 25-1 but has only two transceivers and two antennas (i.e., $N_2$=$N_3$=2). In other embodiments, the client station 25-2 and/or the client stations 25-3 include other numbers of transceivers and antennas (e.g., 1, 3, 4, 5, 6, 7, 8, etc.). Although, only an example implementation, in the IEEE 802.11ac Standard, the AP may have up to 8 antennas and may support simultaneous communication with up to 4 stations.

In an embodiment, the AP 14 is configured to transmit multiple spatial streams to multiple ones of the client stations 25, such as the client stations 25-1 and 25-2, so that each of these stations receives data via a respective number of spatial streams. In an embodiment, two or more of the client stations 25 are configured to receive corresponding data streams having been simultaneously transmitted from the AP 14. Further, in an example scenario, the AP 14 temporarily associates several client stations 25 (e.g., stations 25-1 and 25-2) with a MU group, and transmits one or more data frames in which client-specific portions are simultaneously transmitted to the stations associated with the MU group using spatial multiplexing. For example, the AP 14 simultaneously transmits data via five spatial streams, and the client station 25-1 receives data via three spatial streams, whereas the client station 25-2 receives data via two spatial streams, in an embodiment. In an embodiment, a client station can utilize no more spatial streams than the number of antennas with which the client station is equipped. Further, when space-time coding is employed, the multiple spatial streams are sometimes referred to by those of ordinary skill in the art as space-time streams. If the number of space-time streams is less than the number of transmit chains, spatial mapping is employed, in some embodiments.

For simplicity, simultaneous transmission of data from a network device to two or more network devices via the same radio channel (e.g., frequency) is referred to herein as "MU transmission." In contrast, transmission of a communication frame to a particular single network device is referred to herein as "SU transmission." In an embodiment, the AP 14 employs multiple transmission when AP 14 operates in "MU mode," and employs SU transmission when the AP 14 operates in "SU mode."

In an embodiment, network devices capable of generating communication frames for MU transmissions and processing MU transmissions are configured to operate at least according to a protocol referred to herein as very high throughput (VHT) protocol (e.g., the IEEE 802.11ac Standard). In general, a network device that operates according to the VHT protocol is capable of generating and processing both MU and SU transmissions.

In an embodiment, the AP 14 communicates with the client station 25-1 over a multiple input, multiple output (MIMO) channel defined, at the one end, by the array including the antennas 24-1, 24-2, and 24-3 and, at the other end, by the array including the antennas 34-1, 34-2, and 34-3. For this example, the MIMO channel can be described by a three-by-three channel matrix $H_1$ that specifies, in each element, a channel gain parameter for a stream defined by the corresponding transmit antenna and a receive antenna and a channel phase between the corresponding pairs of antennas. Similarly, the AP communicates with the client stations 25-2 and 25-3 via MIMO channels described by matrices $H_2$ and $H_3$, respectively. In at least some embodiments, the dimensionality of a matrix $H_1$ describing a MIMO channel between the AP 14 and a client station 25-*i* is $N_1 \times N_T$.

In operation, according to an embodiment, the AP 14 defines an MU group, i.e., a group of client stations to which at least one data frame is to be transmitted simultaneously, with a portion of the data frame carrying station-specific information via a respective set of spatial streams. When forming an MU group, the AP 14 considers one or more of the capability of each client station, the type of data to be transmitted to each client station, etc. In an embodiment, the AP 14 selects up to four client stations for participation in each group. In an embodiment, the number of client stations in a group is limited by the number of transmit antennas with which the AP 14 is equipped.

In various embodiments, the AP 14 selects client stations to be included in a group based on information descriptive of respective communication channels ("channel descriptions") between the AP 14 and each of a plurality of candidate client stations 25 to be included in the group. In an embodiment, the AP 14 selects client stations 25 to be included in a group so as to minimize interference that each client station in the MU group experiences due to simultaneous transmissions to the other client stations in the MU group. In an embodiment, the AP 14 selects client stations as to also maximize, at each of the client stations in the MU group, signal to interference plus noise ratio (SINR) in the signal intended for the client station. As will be explained in more detail below, in various embodiments and scenarios, the AP 14 selects the client stations to be included in a group such that respective communication channels between AP 14 and the client stations in the group are orthogonal, or nearly orthogonal, with respect to each other.

Next, in an embodiment, the AP 14 assigns a group identifier (group ID or simply GID) to the group and announces the group formation by including a group definition field in a management or control communication frame, for example. In an embodiment, the AP 14 includes a group definition field in a channel sounding communication frame. In an embodiment, the AP 14 generates a communication frame that includes several group definition fields and a field that specifies the number of group definition fields included.

As an example, referring to FIG. 1, the AP 14 determines that communication channels between the AP 14 and the client stations 25-1 and 25-2 are orthogonal, or nearly orthogonal, with respect to each other, in an example embodiment and scenario. The AP 14 then groups the client stations 25-1 and 25-2 in a single MU group and simultaneously (e.g., via a single transmission) transmits data to each of the client stations 25-1 and 25-2 in the MU group. Similarly, the AP 14 determines that the communication channels between the AP 14 and the client stations 25-1, 25-2 and 25-3 are orthogonal, or nearly orthogonal, with respect to each other, in another example embodiment and scenario. In this example embodiment and scenario, the AP 14 groups client stations 25-1, 25-2 and 25-3 into a single MU group and simultaneously (e.g., via a single transmission) transmits data to each of the client stations 25-1, 25-2 and 25-3.

In some embodiments, the AP 14 selects each of one or more particular client stations 25 to be included in multiple MU groups. For example, the AP 14 determines that the communication channels between the AP 14 and the client stations 25-1 and 25-2 are orthogonal, or nearly orthogonal, with respect to each other, and groups the client stations 25-1 and 25-2 into a first MU group. Continuing with the same embodiment and scenario, the AP 14 also determines that the communication channels between the AP 14 and the client stations 25-1 and 25-3 are orthogonal, or nearly orthogonal, with respect to each other, and groups the client stations 25-1 and 25-3 into a second MU group. In this embodiment and scenario, the client station 25-1 is a member of the first MU group and is also a member of the second MU group. Accordingly, the client station 25-1 can receive data simultaneously with the client station 25-2 when the AP 14 transmits to the first MU group, and can also receive data simultaneously with the client station 25-3 when the AP 14 transmits data to the second MU group.

In some embodiments, in operation, prior to simultaneously transmitting data to client stations in a formed MU group, the AP 14 transmits a sounding packet, such as a non-data packet (NDP), directed to each of the client stations in the group. The sounding packet includes training data that allows each of the client stations in the group to measure the communication channel between the AP 14 and the client station. Each client station then provides to the AP 14 feedback containing information descriptive of the measured channel between the AP 14 and the client station, in an embodiment. In an embodiment, the client stations transmit this feedback information to the AP in a particular order. For example, one of the client stations is designated as a "first" client station in the MU group of client stations, in an embodiment. The client station 25 that is designated as the first client stations is the first client station transmits the feedback to the AP 14. For example, the "first" client station transmits the feedback to the AP 14 when the feedback is generated, without being prompted by the AP 14. The AP 14 receives the feedback information from the first client station, and then successively polls each of the remaining client stations in the group of client stations for the feedback information from each of the remaining client stations, in an embodiment. The AP 14 then calculates a steering, or a pre-coding, matrix based on the feedback information received from each client station in the MU group, in an embodiment. The AP 14 calculates the steering matrix so as to eliminate, reduce or minimize, at each client station in the MU group of client stations, interference caused by the simultaneous transmissions to the other client stations in the group of client stations. The AP 14 then generates a data unit that includes independent data streams to the client stations in the MU group. In at least some embodiments, such data unit includes a preamble, and the preamble includes various information that allows the client station to determine that the data unit is directed to the MU group of which the client station is a member (e.g., the MU group ID), the number of spatial streams directed to the client stations, etc. The AP 14 then transmits the data unit using the calculated steering matrix to advantageously shape the transmission or steer the transmission intended for each particular client stations in the direction of the client particular station, in an embodiment.

With continued reference to FIG. 1, prior to forming an MU group, in order to identify two or more orthogonal, or nearly orthogonal, communication channels, between the AP and two or more client stations 25, the AP 14 first obtains, in some form, descriptions of the communication channels between the AP 14 and a plurality of candidate client stations 25 (e.g., each of the client stations 25 associated with the AP 14, a subset of the client stations associated with the AP 14, such as a subset of the client stations 25 for which the AP 14 has data to be transmitted, a subset of client stations 25 that support MU communication with the AP 14, etc.). To obtain the channel descriptions, in an embodiment, the AP 14 sends a sounding packet to each of the client stations 25 or to each candidate client station 25 in a subset of client stations 25. Each client station 25 that receives a sounding packet from the AP 14 develops a channel estimate using the sounding packet and then feeds back some form of the channel estimate, or other data derived from the channel estimate, to the AP 14, in an embodiment. In another embodiment, the AP 14 develops a channel estimate of a channel associated with a client station 25 based on one or more uplink data units that the AP 14 receives from the client station 25. That is, the AP 14 obtains a channel estimate of an uplink channel from the client station 24 and the AP 14 and derives a channel description of the downlink channel between the AP 14 and the client station 25 by assuming channel reciprocity, in this embodiment.

In any event, upon obtaining descriptions of a plurality of communication channels associated with a plurality of client stations 25, the AP 14 identifies one or more subsets of the plurality of communication channels, each subset of the plurality of communication channels including orthogonal, or nearly orthogonal, communication channels, according to an embodiment. In various embodiments, the AP 14 identifies orthogonal, or nearly orthogonal, communication channels based on cross-correlation products of channel matrices corresponding to the communication channels and/ or based on cross-products of channel vectors corresponding to the communication channels.

For ease of explanation, in embodiments described below, the AP 14 selects, to be included in an MU group, client stations 25 from a plurality of candidate client stations 25 each having a single receive antenna, and the AP 14 utilizes a respective transmit antenna at the AP 14 to transmit data to each of the client stations 25 in the MU group. In this case, respective communication channels between the AP 14 and each of the client stations 25-*i* can be represented by a respective vector $v_i$. Further, for simplicity, in the embodiments described below, the AP 14 selects a pair of client stations 25 (i.e., two client stations 25) to be included in a single MU group. It is noted, however, that techniques for selecting client stations 25 are easily extendable to systems or situations in which one or more of the client stations 25 is/are equipped with multiple receive antennas and/or systems or situations in which the AP 14 utilizes multiple antennas to communicate with each of one or more of the client stations 25, in some embodiments. In such embodiments, a communication channel between the AP 14 and a client station equipped with multiple receive antennas is represented by a channel matrix H. Generally speaking, as used herein, a channel vector is a particular instance of a channel matrix, i.e. a channel vector is a type of channel matrix. Similarly, as used herein, a beamforming or steering vector is a particular instance of a beamforming or steering matrix, i.e. a beamforming or steering vector is a type of a beamforming or steering matrix. It is further noted that techniques described herein are easily extendable to selecting more than two (e.g., 3, 4, 5, 6, etc.) client stations 25 to be included in an MU group, in some embodiments.

In an example system in which the AP 14 utilizes a respective transmit antenna to transmit a respective signal to each of the client stations 25 in an MU group, and each of the client stations 25 in the MU group receives the respective signal via a single receive antenna, the received signal $y_i$ received by a client station 25-*i* from the AP 14 can be modeled as $$y_i = \underbrace{h_i q_i x_i}_{\text{intended}} + h_i \underbrace{\sum_{k \neq i}^{K} q_k x_k}_{\text{interference}} + \underbrace{n_i}_{\text{noise}} \qquad \text{Equation 1}$$

In Equation 1, $x_i$ is the transmitted signal intended for the client station 25-*i*, $h_i$ is the vector representing the communication channel between the AP 14 and the client stations 25-*i*, $q_i$ is a steering vector applied to the signal $x_i$, $x_k$ is the signal transmitted to a client station 25-*k*, $q_k$ is a steering matrix applied to the signal $x_k$, K is the number of client stations 25 in an MU group of client stations 25, and $n_i$ is additive noise at the client station 25-*i*. As illustrated in Equation 1, the received signal $y_i$ includes an intended component, an interference component due to signals directed to other client stations, and a noise component. In an embodiment, to minimize interference at the client station 25-*i* due to signals transmitted to other client stations 25, the AP 14 attempts to select the steering vector $q_k$ for to each of the other client stations 25-*k* such that $$h_i q_k \approx 0 \, \forall i \neq k \qquad \text{Equation 2}$$

Further, to maximize the signal to noise ratio of the intended component of the received signal $y_i$, the AP 14 attempts to select vector $q_i$ for the client station 25-*i* such that the vector $q_i$ is along the communication channel between the AP 14 and the client station 25-*i*, in an embodiment. In mathematical terms, in this case, the vector $q_i$ satisfies:

$$q_i = \frac{h_i}{\|h_i\|} \qquad \text{Equation 3}$$

Equations 2 and 3 can both be satisfied when the communication channel between the AP 14 and the client station 25-*i* is orthogonal, or nearly orthogonal, to each of the communication channels between the AP 14 and the other client stations 25 an MU group, in an embodiment.

In communication systems that utilize orthogonal frequency division multiplexing (OFDM), Equation 1 corresponds to each subcarrier or to each of group of subcarriers, in various embodiments. Accordingly, in embodiments in which the AP 14 and the client stations 25 communicate using orthogonal frequency division multiplexing (OFDM), a signal received by a client station 25-*i* on a sub-carrier (or "tone") j in the presence of simultaneous transmissions to other client stations 25 in an MU group of stations 25, Equations 1-3 can be written as Equations 4-6, respectively.

$$y_i^{(j)} = \underbrace{h_i^{(j)} q_i^{(j)} x_i^{(j)}}_{\text{intended}} + h_i^{(j)} \underbrace{\sum_{k \neq i}^{K} q_k^{(j)} x_k^{(j)}}_{\text{interference}} + \underbrace{n_i^k}_{\text{noise}} \qquad \text{Equation 4}$$

$$h_i^{(j)} q_k^{(j)} \approx 0 \, \forall i \neq k \qquad \text{Equation 5}$$

$$q_i^{(j)} = \frac{h_i^{(j)}}{\|h_i^{(j)}\|} \qquad \text{Equation 6}$$

The AP 14 attempts to determine the vectors $q_i^{(j)}$ and $q_k^{(j)}$ such that Equation 5 and Equation 6 are both satisfied at each subcarrier j, at each group of subcarriers j, or averaged over all or a subset of subcarriers j, for example, in various embodiments. In embodiments described below, OFDM communication between the AP 14 and the client stations 25 is assumed. It is noted, however, that the user selection techniques of the present disclosure are applied to single carrier communication systems in other embodiments.

In an embodiment, the AP 14 selects, to be included in an MU group of client stations 25, those client stations 25 that are associated with communication channels, between the AP 14 and the client stations 25, that are orthogonal, or nearly orthogonal, to one another. As discussed above, in various embodiments, to select client stations 25 associated with orthogonal, or nearly orthogonal, communication channels, the AP 14 identifies two or more communication channels that satisfy a certain constraint, or a set of certain constraints, related to orthogonality between the two or more communication channels, and selects the client stations 25 associated with identified communication channels. Selecting client stations 25 such that communication channels between the AP 14 and the client stations 25 are orthogonal, or nearly orthogonal, to each other, allows the AP 14 to determine steering vectors $q_i^{(j)}$ and $q_k^{(j)}$ such that Equation 5 and Equation 6 are both satisfied for the group of client stations, in at least some embodiments. Moreover, selecting client stations 25 such that communication channels between the AP 14 and the client stations 25 are orthogonal, or nearly orthogonal, to each other, allows the AP 14 to determine the steering vectors $q_i^{(j)}$ and $q_k^{(j)}$ such that signal power (e.g., signal interference plus noise ratio (SINR)) is maximized at each of the client stations 25 in the group, in at least some embodiments.

In some embodiments that utilize OFDM communication, various metrics associated with the communication channels are determined for each subcarrier of an OFDM channel. A single corresponding metric is then determined by averaging the metric across the sub-carriers of the OFDM channel, in an embodiment. Alternatively, in some embodiments, metrics are determined for a subset of sub-carriers. For example, certain sub-carriers, such as "edge tones" and/or "DC tones," are excluded from the set of sub-carriers for which metrics are determined, in some embodiments. As another example, a respective metric is determined for one sub-carrier in each of a plurality of groups of sub-carriers, such as for every other sub-carrier, every third sub-carrier, every fourth sub-carrier, etc., and the determined metrics are then averaged over the groups of sub-carriers. In an embodiment, the number of sub-carriers in a group of sub-carriers for which metrics are determined is determined based on coherence time of the communication channel, or the amount of time during which the communication channels remain, or is expected to remain, relatively unchanged, in an embodiment. Additionally or alternatively, the number of sub-carriers in a group of sub-carriers for which metrics are determined is determined based on coherence bandwidth of the communication channel, or a portion of the full bandwidth of the channel for which the channel has, or is expected to have, at least substantially flat response, in some embodiments.

Figure 2:
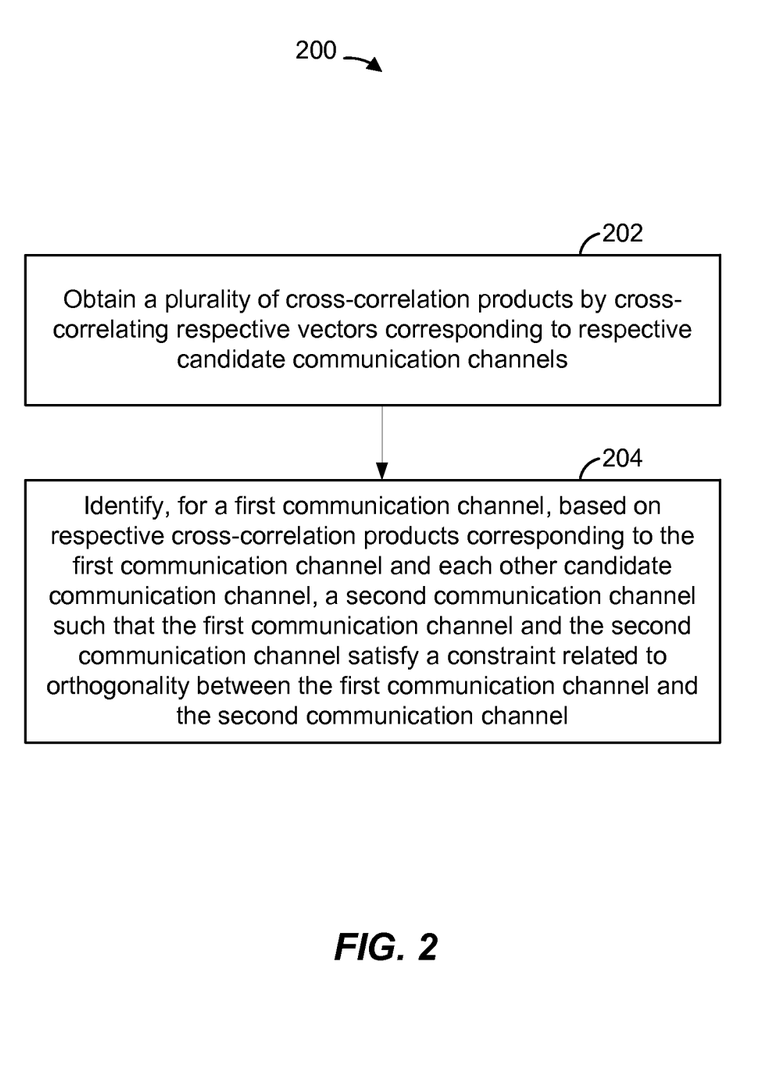
FIG. 2 is a flow diagram of an example procedure for identifying two communication channel that satisfy one or more predetermined constraints related to orthogonality between the two or communication channels, according to an embodiment.

FIG. 2 is a block diagram of an example procedure 200 for identifying two or more communication channels that satisfy a predetermine constraint related to orthogonality between the two or more communication channels, according to an embodiment. In an embodiment, the AP 14 performs the procedure 200 to identify two or more communication channels using respective vector representations of each of a plurality of candidate communication channels. In an embodiment, the procedure 200 is performed by the network interface device 16. For example, in an embodiment, the procedure 200 is performed by the PHY processing unit 20. In other embodiments, the procedure 200 is performed by other components of the AP 14 or by other suitable communication devices different than the AP 14. Similarly, in some embodiments, the AP 14 performs suitable procedures other than the procedure 200 to identify the two or more communication channels.

The procedure 200 begins at block 202, at which the AP 14 obtains a plurality of cross-correlation products by cross-correlating each vector corresponding to a particular communication channels with each of the other vectors corresponding to each of the other communication channels. In an embodiment, the AP 14 obtains a respective cross-correlation product corresponding to each pair of communication channel, wherein each cross-correlation product corresponds to the cross products of the pair of vectors corresponding to the communication channels at each tone j, or each tone in a subset of tones j. As referred to herein, "cross product" as applied to "channel vectors" is a particular instance of "cross-correlation" as applied to "channel matrices."

For example, for each client station i, on each tone or each group of tones j, the AP 14 obtains, at block 202, a sequence of cross products:

$$|<v_i^{(j)},v_1^{(j)}>|, |<v_i^{(j)},v_2^{(j)}>|, \ldots, |<v_i^{(j)},v_{i-1}^{(j)}>|, |<v_i^{(j)},v_{i+1}^{(j)}>|, \ldots, |<v_i^{(j)},v_k^{(j)}>|$$

where $|<v_i^{(j)},v_n^{(j)}>|$ is the magnitude of the cross product between the vector $v_i$ and the vector $v_n$ corresponding to the tone j of the OFDM tones or of a subset of OFDM tones, and k is the number of candidate communication channels.

At block 204, the AP 14 identifies, for a first communication channel, a second communication channel, such that the first communication channel and the second communication channel satisfy one or more constraints related to orthogonality between the first communication channel and the second communication channel. In an embodiment, the AP 14 identifies the second communication channel based on cross-correlation products corresponding to the first communication channel and each of the other communication channels. For example, in some embodiments, the AP 14 identifies two or more communication channel so as to minimize interference between the first and the second communication channels caused by simultaneous transmissions on the first and the second communication channels. In one such embodiment, the AP 14 first determines, based on the cross-correlation products obtained at block 202, respective interference indicators indicative of interference on the first communication channel due to transmissions on each of the other communication channels among the candidate communication channels. In an embodiment, the AP 14 determines each interference indicator as an average of interference indicators over all OFDM tones j, or over all groups of OFDM tones j, according to:

$$\frac{1}{N}\sum_{j=0}^{N-1}|\langle v_i^{(j)}, v_m^{(j)}\rangle|^2 \qquad \text{Equation 7}$$

where N is the number of OFDM tones or the number of OFDM tones in a group of OFDM tones.

The AP 14 then identifies, for a first communication channel, a second communication channel such that interference indicator corresponding to the first communication channel and the second communication channel is less than any of the interference indicators corresponding to the first channel and any one of the other communication channels. That is, in this embodiment, the AP 14 identifies, for a first communication channel associated with a client station 25-i, a second communication channel associated with a client station 25-m, such that $$m = \min_m \left(\frac{1}{N}\sum_{j=0}^{N-1}|\langle v_i^{(j)}, v_m^{(j)}\rangle|^2\right) \qquad \text{Equation 8}$$

In another embodiment, the AP 14 identifies two or more communication channels so as to maximize signal to interference plus noise ratio (SINR) of a signal transmitted on the first communication channel in the presence of a signal transmitted on the second communication channel. In such embodiment, the AP 14 first determines, based on the cross-correlation products obtained at block 202, respective SINR indicators indicative of SINR of a signal transmitted on the first communication channel in presence of signals transmitted on each of the other communication channels. In an embodiment, the AP 14 determines an SINR indicator as an average of interference indicators over all OFDM tones j, or over all groups of OFDM tones j, according to:

$$\frac{1}{N}\sum_{j=0}^{N-1}\frac{1}{|\langle v_i^{(j)}, v_m^{(j)}\rangle|^2} \quad \text{Equation 9}$$

where N is the number of OFDM tones or the number of OFDM tones in a group of OFDM tones.

The AP 14 then identifies, for a first communication channel, a second communication channel such that SINR indicator associated with the first communication channel and the second communication channel is greater than any of the SINR indicators associated with the first channel and any other communication channel among the candidate communication channels. That is, in this embodiment, the AP 14 identifies, for a communication channel associated with a client station 25-i, a communication channel associated with a client station 25-m, such that $$m = \max_{m}\left(\frac{1}{N}\sum_{j=0}^{N-1}\frac{1}{|\langle v_i^{(j)}, v_m^{(j)}\rangle|^2}\right) \quad \text{Equation 10}$$

In yet another example embodiment, the AP 14 identifies two or more communication channel so as to maximize throughput on a first communication channel in the presence of a transmission on the second communication channel. In such embodiment, the AP 14 first determines, based on the cross-correlation products determined at block 202, respective throughput indicators indicative of throughput on the first communication channel in presence of a transmission on each of the other communication channels. In an embodiment, the AP 14 determines each throughput indicator as an average of throughput indicators corresponding to all OFDM tones j, or all groups of OFDM tones j, according to $$\frac{1}{N}\sum_{j=0}^{N-1}\log\left[\frac{1}{|\langle v_i^{(j)}, v_m^{(j)}\rangle|^2}\right] \quad \text{Equation 11}$$

where N is the number of OFDM tones or the number of OFDM tones in a group of OFDM tones.

The AP 14 then identifies, for a first communication channel, a second communication channel such that throughput indicator associated with the first communication channel and the second communication channel is greater than throughput indicators associated with the first communication channel and any of the other communication channels among the candidate communication channels. That is, in this embodiment, the AP 14 identifies, for a communication channel associated with a client station 25-i, a communication channel associated with a client station 25-m, such that $$m = \max_{m}\left(\frac{1}{N}\sum_{j=0}^{N-1}\log\left[\frac{1}{|\langle v_i^{(j)}, v_m^{(j)}\rangle|^2}\right]\right) \quad \text{Equation 12}$$

In some embodiments, block 204 further includes applying additional criteria to the two or more identified communication channels. For example, the AP 14 evaluates the identified two or more channels according to an additional constraint, and groups (i.e., includes in an MU group) client stations associated with the two or more identified communication channels if the two or more identified communication channels satisfy the additional constraint, in an embodiment. On the other hand, if the two or more identified communication channels do not satisfy the additional constraint, the AP 14 does not group the client stations associated with these communication channels, but instead operates in single user mode when communicating with these client stations, in an embodiment.

As just an example, in an embodiment in which the AP 14 identifies the two or more communication channels based on interference indicators, the AP 14 then compares the interference indicator corresponding to the identified first and second communication channels to a threshold $\sigma_{interference}$, and groups client stations associated with the first and the second communication channels if the interference indicator does not exceed the threshold. That is, in an embodiment, the AP 14 forms an MU group that includes the client stations 25-i associated with the first communication channel and the client station 25-m associated with the second communication channel if Equation 13 is satisfied:

$$\frac{1}{N}\sum_{j=0}^{N-1}\frac{1}{|\langle v_i^{(j)}, v_m^{(j)}\rangle|^2} < \sigma_{interference} \quad \text{Equation 13}$$

where N is the number of OFDM tones or the number of groups of OFDM tones.

On the other hand, if the interference indicator, for example at one or more tones j or averaged over a plurality of tones j, is equal to or greater than the interference threshold, then the AP 14 does not form an MU group that includes the client stations 25-i and the client station 25-m. Instead, the AP 14 operates in SU mode when transmitting data to the client station 25-i and the client station 25-m, and transmits data individually to the client station 25-i and the client stations 25-m, in an embodiment.

As another example, in another embodiment, the AP 14 compares the cross-correlation product associated with the identified first and second communication channels to a threshold $\sigma_{cross-correlation}$, and groups client stations associated with the first and the second communication channels if the cross-correlation product does not exceed the threshold $\sigma_{cross-correlation}$. That is, in an embodiment, the AP 14 forms an MU group that includes the client stations 25-i associated with the first communication channel and the client station 25-m associated with the second communication channel if Equation 14 is satisfied:

$$|\langle v_i^{(j)}, v_m^{(j)}\rangle|, < \sigma_{cross-correlation} \forall 0 \leq j \leq N \quad \text{Equation 14}$$

On the other hand, if the cross-correlation product, for example at one or more tones j or averaged over a plurality of tones j, exceeds the threshold, then the AP 14 does not form an MU group that includes the client station 25-i and the client station 25-m. Instead, the AP 14 operates in SU mode when transmitting data to the client station 25-i and the client station 25-m, and transmits data individually to the client station 25-i and the client stations 25-m, in an embodiment.

Figure 3:
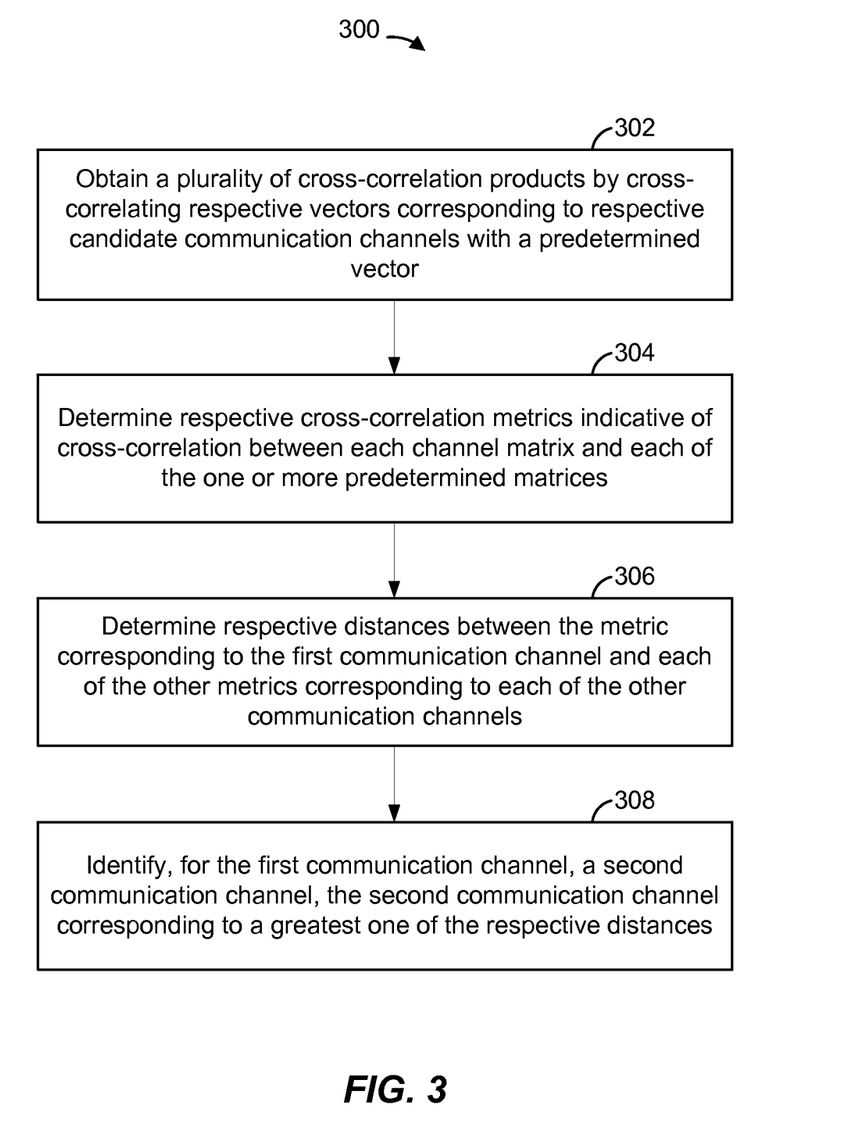
FIG. 3 is a flow diagram of another example procedure for identifying two communication channel that satisfy one or more predetermined constraints related to orthogonality between the two or communication channels, according to another embodiment.

FIG. 3 is a block diagram of an example procedure 300 for identifying two or more communication channels that satisfy a predetermine constraint related to orthogonality between the two or more communication channels, according to another embodiment. In an embodiment, the AP 14 performs the procedure 300 to identify the two or more communication channels using respective vector representations of each of a plurality of candidate communication channels. In an embodiment, the procedure 300 is performed by the network interface device 16. For example, in an embodiment, the procedure 300 is performed by the PHY processing unit 20. In other embodiments, the procedure 300 is performed by other components of the AP 14 or by other suitable communication devices different than the AP 14. Similarly, in some embodiments, the AP 14 performs suitable procedures other than the procedure 300 to identify the two or more communication channels.

Similar to the procedure 200, in an embodiment, the AP 14 performs the procedure 300 to identify the two or more communication channels using respective vector representations of each of a plurality of candidate communication channels. However, according to the procedure 300, instead of performing cross-correlations between respective vectors corresponding to candidate communication channel with one another, the AP 14 computes cross-correlations between vectors corresponding to the candidate communication channels with a predetermined vector b. As a result, computational complexity associated with the procedure 300 is generally reduced with respect to the procedure 200, in at least some embodiments. For example, while the procedure 200, in an embodiment, requires computation of approximately $K^2$ cross-correlation products, the procedure 300 requires computation of dK cross-correlation products, where K is the number of candidate communication channels and d is the number of cross-correlation products obtained for each of the K communication channels, in various embodiments. Accordingly, computational complexity associated with the procedure 300 increases linearly with increasing number of candidate communication channels compared to exponential increase in computational complexity associated with the procedure 200. Moreover, while, in at least some embodiments, the procedure 200 requires re-calculation of all of the cross-correlation products in an event of a change or an update to a vector corresponding to any one of the candidate communication channels, the procedure 300 requires that the AP 14 recalculate only the cross-correlation products corresponding to the particular candidate communication channel in which the change or the update has occurred, according to an embodiment.

In an embodiment, the AP 14 utilizes the procedure 300, or another suitable reduced computational complexity, to dynamically select client stations to be included in an MU group, for example at the time of transmission to the MU group. Further, in some embodiments, to reduce computations required to select client stations 25, the AP 14 limits the number of candidate client stations 25, for example to include only those client stations 25 for which the AP has data to be transmitted, to include only those client stations 25 for which the AP 14 has sufficiently recent channel descriptions, etc.

The procedure 300 begins at block 302, at which the AP 14 obtains a plurality of cross-correlation products by cross-correlating each vector corresponding to each particular communication channel with a predetermined vector. In an embodiment, the AP 14 obtains, at block 302, a plurality of cross-products, each cross-product between a channel vector, corresponding to a particular communication channel, and a predetermined vector b.

At block 304, the AP 14 determines respective cross-correlation metrics indicative of cross-correlation between each channel vector (or matrix), corresponding to a particular communication channel, and the predetermined vector (or matrix). For example, the AP 14 determines, at block 304, for each client station 25-$i$, a cross-product between $\beta_i$ between a channel vector $v_i$ and the predetermined vector b, averaged over a plurality of OFDM tones j, or a subset of OFDM tones j, according to $$\beta_i = \frac{1}{N}\sum_{j=0}^{N-1} |\langle v_i^{(j)}, b\rangle|^2 \qquad \text{Equation 15}$$

where N is the number of OFDM tones or the number of OFDM tones in a subset of tones.

In other embodiments, the AP 14 determines other suitable metrics based on the cross-correlation products. As just an example, in an embodiment, the AP 14 determines, for each candidate client station 25-$i$, a cross-correlation product $\beta_i$ according to $$\beta_i = \frac{1}{N}\sum_{j=0}^{N-1} |\langle v_i^{(j)}, b\rangle| \qquad \text{Equation 16}$$

where N is the number of OFDM tones or the number of OFDM tones in a subset of tones.

At block 306, the AP 14 determines, for each client station m, a distance between $\beta_m$ corresponding to the communication channel associated with the client station 25-$m$ and $\beta_n$ corresponding to the respective communication channels associated with the each of the other client stations 25-$n$. For example, the AP 14 determines a distance between $\beta_m$ corresponding to the communication channel associated with the client station 25-$m$ and $\beta_n$ corresponding to the respective communication channels associated with each of the other client station 25-$n$ according to:

$$d_{m,n} = |\beta_m - \beta_n| \qquad \text{Equation 18}$$

Then, at block 308, the AP 14 identifies, for a first client station 25-$m$ associated with a first communication channel, a second client station 25-$n$ associated with a second communication channel such that $$m, n = \max_{m,n}|\beta_m - \beta_n| \qquad \text{Equation 19}$$

In the example embodiments described above, the AP 14 determines a single cross-correlation product $\beta_i$ for each candidate client station 25-$i$. In particular, according to Equation 15 (or Equations 16), the AP 14 determines a single cross-correlation product $\beta_i$ as an average of cross-correlation products $\beta_i$ across a plurality of OFDM tones j, in these embodiments. Alternatively, in some embodiments, the AP 14 determines multiple cross-correlation products $\beta_i$ for each candidate client station 25-$i$. For example, in an embodiment, the AP 14 determines a $\beta_{i_{max}}$ corresponding to an OFDM tone having a maximum cross-correlation product among a plurality of cross-correlation products determined for a plurality of OFDM tones and $\beta_{i_{min}}$ corresponding to an OFDM tone having a minimum cross-correlation product among the plurality of cross-correlation products determined for the plurality of OFDM tones. In mathematical terms, in an embodiment, the AP 14 determines, for a client station 25-$i$, a set of cross-correlation products $\beta_i$ according to $$\beta_i = \left\{ \min_j |\langle v_i^{(j)}, b \rangle|^2, \max_j |\langle v_i^{(j)}, b \rangle|^2 \right\} \qquad \text{Equation 19}$$

In an embodiment, $\beta_i$ corresponding to each candidate client station 25-$i$ defines a band in the range of [0, 1]. In an embodiment, the AP 14 then identifies, at block 304, a first client station 25-$m$ and a second client station 25-$n$, wherein the band defined by $\beta_m$ corresponding to the client station 25-$m$ does not overlap with and/or is sufficiently separated from the band defined by $\beta_n$ corresponding to the client station 25-$n$. For example, in an embodiment, the AP 14 identifies a first client station 25-$m$ and a second client station 25-$n$, wherein the band defined by $\beta_m$ corresponding to the client station 25-$m$ is separated from the band defined by $\beta_n$ corresponding to the client station 25-$n$ by a value that is greater than a threshold $\sigma_{cross-correlation\ band}$. In mathematical terms, in this embodiment, the AP 14 selects, for a client station 25-$m$, a client station 25-$n$ such that $$\left| \max_j |\langle v_m^{(j)}, b \rangle|^2 - \min_j |\langle v_n^{(j)}, b \rangle|^2 \right| > \sigma_{cross-correlation\ band} \qquad \text{Equation 20}$$

The predetermined vector b used at block 302 can be any suitable vector having the same number n of elements as each channel vector v (e.g., $n = N_{tx}$, where $N_{tx}$ is the number of transmit antennas at the AP 14), in various embodiments and scenarios. In an embodiment, the predetermined vector b is given by $b = c[111 \ldots 1]$, where c is a unit normalization factor determined according to $$c = \frac{1}{\sqrt{N_{tx}}} \qquad \text{Equation 17}$$

where the number of elements in the vector b corresponds to the number of transmit antennas at the AP 14 $N_{tx}$. In another embodiment, the predetermined vector b is given by $b = c[100 \ldots 0]$, where c is a unit normalization factor as given in Equation 17, and where the number of elements in the vector b corresponds to the number of transmit antennas at the AP 14 $N_{tx}$. In this embodiment, the procedure 300 results in identifying two or more communication channels associated with vectors with sufficient distance between channel vector components corresponding to the first transmit antenna of the AP 14 and the receive antenna the client stations 25. Similarly, in another embodiment, the predetermined vector b is given by $b = c[010 \ldots 0]$. In this case, the procedure 300 results in identifying communication channels associated with vectors with sufficient distance between channel vector components corresponding to the second transmit antenna of the AP 14 and the receive antenna the client stations 25, and so on.

In some situations, when the AP 14 attempts to identify the two or more communication channels based on cross-correlations between channel vectors and a predetermined vector b, the AP 14 may fail to detect two or more communication channels that are orthogonal, or at least sufficiently orthogonal, to each other, particularly in systems in which the AP 14 includes relatively greater numbers of transmit antennas. To reduce or eliminate such failed detections, in some embodiments, block 302 includes cross-correlating respective vectors corresponding to each candidate communication channels with each of multiple ones of predetermined vectors b. In such embodiments, at block 308, the AP 14 identifies the two or more communication channels based on the multiple cross-correlation products corresponding to each of the candidate communication channels. In an embodiment, the number of predetermined vectors b used at block 302 is related to the number of transmit antennas at AP 14. For example, the number of predetermined vectors b used at block 302 corresponds to the number of antennas at AP 14, in an embodiment. Accordingly, two different predetermined vectors b are used in an example embodiment in which the AP 14 includes two transmit antennas, three different predetermined vectors are used in an example embodiment in which the AP 14 includes three transmit antennas, and so on. In other embodiments, other suitable numbers of predetermined vectors b are utilized.

In one example embodiment in which multiple predetermined vectors b are utilized at block 302, a particular predetermined vector b is used at any given time. In such embodiment, block 302 includes periodically changing the particular predetermined vector b that is being utilized. In an embodiment, the rate of change of the particular vector b being used is determined based on a combined coherence time for the candidate communication channels, i.e. based on the amount of time during which the candidate communication channels remain, or are expected to remain, relatively unchanged. Every time the predetermined vector b is changed at block 302, a new set of cross-correlation products is obtained using the new predetermined vector b, in an embodiment. New pairs of communication channels, based on the new set of cross-correlation products are then identified at block 304, in an embodiment.

In another example embodiment in which multiple predetermined vectors b are utilized at block 302, different ones of the predetermined vectors b are utilized for different ones of OFDM tones j. For example, a first predetermined vector $b_1$ is used for OFDM tones in the first half of a bandwidth BW, e.g., OFDM tones in the set [0, N/2−1], and a second predetermined vector $b_2$ is used for OFDM tones in the second half of the bandwidth BW, e.g. for OFDM tones in the set [N/2 to N−1], where N is the number of OFDM tones that span the bandwidth BW. As an example, in one such embodiment, the first predetermined vector b is given by $b_1 = c_1[1\ 1\ \ldots\ 1]$, and the second predetermined vector b is given by $b_2 = c_2[-1\ 1\ \ldots\ 1]$. In other embodiments, the first predetermined vector $b_1$ and/or the second predetermined vector $b_2$ are other suitable vectors.

In another example embodiment in which different predetermined vectors b are utilized for different OFDM tones, the AP 14 selects the vectors from a matrix B in which each column corresponds to a particular predetermined vector. In an embodiment, round robin selection of the different columns of the matrix B is utilized. In an embodiment, the AP 14 selects a new column of the matrix B to be used with each OFDM tone or each group of a number L of OFDM tones. Thus, for example, the AP 14 utilizes the first column with the first OFDM tone of with the first group of L OFDM tones, then switches to the second column of the matrix B to be used with the second OFDM tone or with the second group of L OFDM tones, and so on, until the last column of the matrix B is reached. Then, if there are any remaining OFDM tones for which a cross-correlation is to be computed, selection returns to the first column of the matrix B, in an embodiment. In at least some embodiments in which different predetermined vectors b are used with different groups of OFDM tones, the number L of OFDM tones in a group is determined based on coherence bandwidth, or a portion of the bandwidth BW for which the channel has, or is expected to have, at least substantially flat response.

In some embodiments, the particular columns of the matrix B that are selected to be used with particular OFDM tones, or OFDM groups of tones, change with time. For example, the AP 14 begins round robin selection with selecting the first column of the matrix B to be used with the first OFDM tone or the first group of OFDM tones, and after a certain period of time switches to beginning round robin selection with the second column of the matrix B, and so on, in an embodiment. The rate of change of the particular columns of the matrix B to be used with particular OFDM tones (e.g., with particular portions of the bandwidth BW) is determined based on a combined coherence time for the candidate communication channels, i.e., based on the amount of time during which the candidate communication channels remain, or are expected to remain, relatively unchanged, in an embodiment.

In various embodiments, the matrix B is a suitable matrix with unit norm columns, or columns normalized to unitary length. In various embodiments, the matrix B is unitary matrix. In another embodiment, the matrix B is another suitable type of matrix.

Figure 4:
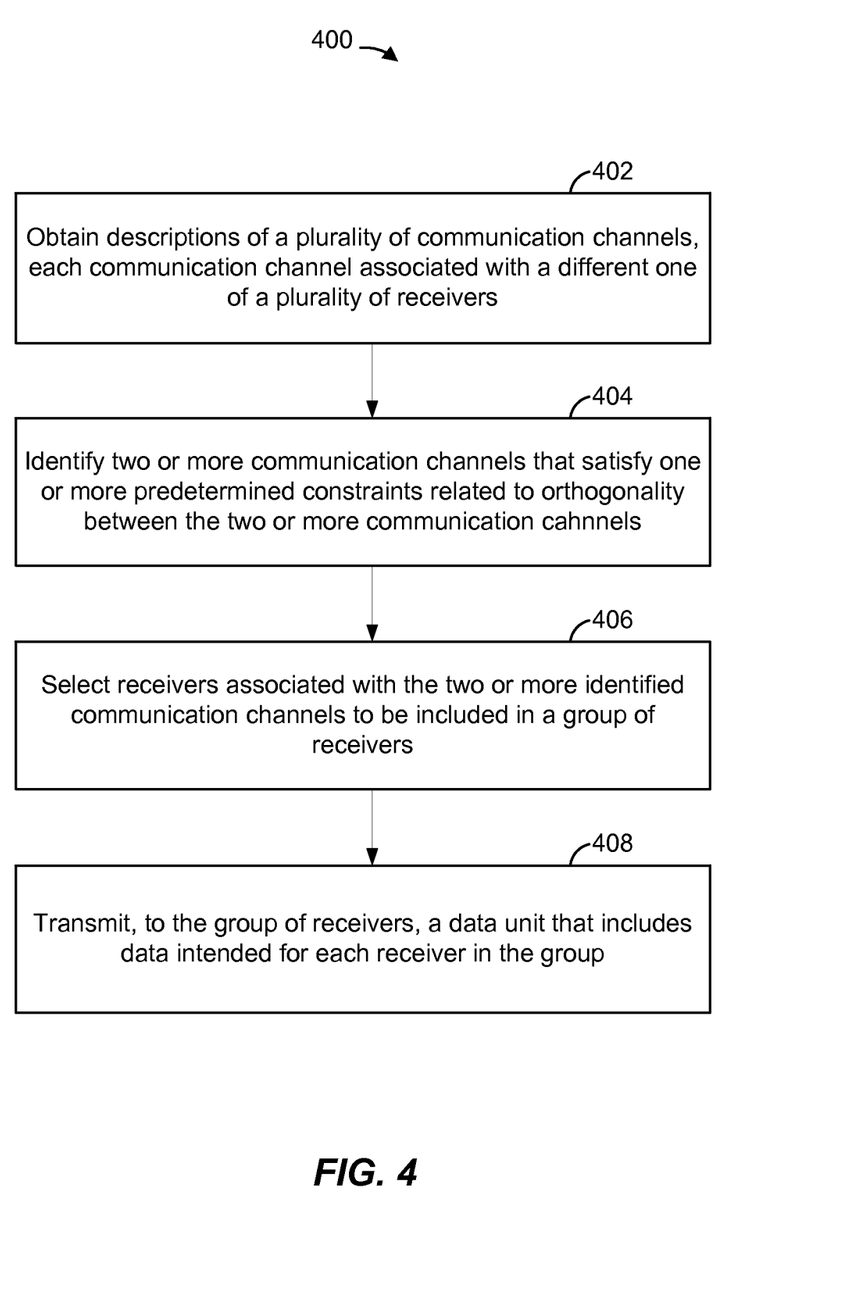
FIG. 4 is a flow diagram of an example method for selecting receivers to be included in a multi-user group of receivers, according to an embodiment.

FIG. 4 is a flow diagram of an example method for selecting receivers to be included in a multi-user group of receivers, according to an embodiment. In an embodiment, the method 400 is implemented by the AP 14. In an embodiment, the network interface device 16 is configured to implement the method 400. For example, in an embodiment, the PHY processing unit 20 is configured to implement the method 400. In other embodiments, the method 400 is implemented by other components of the AP 14 or by other suitable communication devices different than the AP 14. Similarly, in some embodiments, the AP 14 is configured to implement suitable methods other than the method 400, in some embodiments.

At block 402, the AP 14 obtains descriptions of a plurality of communication channels, each communication channel associated with a different one of a plurality of receivers. For example, the AP 14 obtains a plurality of channel matrices, or a plurality of channel vectors, corresponding to each of the channels $H_1$, $H_2$, and $H_3$ associated with the client stations 25-1, 25-2, and 25-3, respectively, according to an embodiment. In an embodiment, the AP 14 obtains the plurality of channel descriptions by sending sounding packets to the plurality of client stations 25, and receiving feedback that contains the corresponding channel description from each of the client stations 25. In another embodiment, the AP 14 obtains the plurality of channel descriptions by generating the channel descriptions based one uplink packets that the AP 14 receives from the client stations 25.

At block 404, the AP 14 identifies two or more communication channels, of the plurality of communication channels, that satisfy one or more predetermined constraints related orthogonality of the two or more communication channels. In an embodiment, the AP 14 performs the procedure 200 described above with reference to FIG. 2, or a procedure similar to the procedure 200, to identify the two or more communication channels. In another embodiment, the AP 14 performs the procedure 300 described above with reference to FIG. 3, or a procedure similar to the procedure 300, to identify the two or more communication channels. In other embodiments, the AP 14 identifies the two or more communication channels using other suitable procedures different than the procedure 200 or the procedure 300.

At block 406, the AP 14 selects, to be included in a group of receivers, the receivers associated with the two or more communication channels identified at block 404. Then, at block 408, the AP 14 transmits, to the group of receivers, at least one data unit that includes data intended to each one of the two or more receivers in the group.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention. For example, one or more operations in methods discussed above may be performed in a different order (or concurrently) and still achieve desirable results.

What is claimed is:

1. A method in a communication network, the method comprising:

obtaining descriptions of a plurality of communication channels, wherein obtaining the descriptions of the plurality of communication channels comprises obtaining a plurality of channel matrices associated with respective communication channels of the plurality of communication channels, wherein each communication channel is associated with a different one of a plurality of receivers, and wherein the plurality of receivers includes at least three receivers;

identifying, based on the descriptions of the plurality of communication channels, one or more pairs of communication channels, among the plurality of communication channels, that satisfies one or more predetermined constraints related to orthogonality between communication channels among the plurality of communication channels, including identifying a first pair of communication channels, wherein identifying the first pair of communication channels comprises:

cross-correlating each channel matrix, of the plurality of channel matrices, with one or more predetermined matrices to obtain respective cross-correlation products between each channel matrix and each of the one or more predetermined matrices, wherein the one or more predetermined matrices are one or more particular matrices other than the plurality of channel matrices, and each of the one or more predetermined matrices has the same number of elements as each channel matrix of the plurality of channel matrices, comparing ones of the cross-correlation products with others of the cross-correlation products, and identifying the first pair of communication channels based on the comparing of the cross-correlation products;

selecting, to be included in a group of receivers, receivers associated with the identified one or more pairs of communication channels; and transmitting, to the group of receivers, at least one data unit that includes data intended for each receiver in the group.

2. The method of claim 1, wherein identifying the one or more pairs of communication channels includes identifying a second pair of communication channels, and identifying the second pair of communication channels includes:

cross-correlating a first channel matrix, associated with a first communication channel of the second pair of communication channels, with each other channel matrix respectively associated with each other communication channel to obtain respective cross-correlation products between the first channel matrix and each of the other channel matrices;

comparing ones of the cross-correlation products with others of the cross-correlation products; and identifying the second pair of communication channels based on the comparing of the cross-correlation products.

3. The method of claim 2, wherein identifying the second pair of communication channels based on the comparing of the cross-correlation products includes identifying, for the first communication channel, a second communication channel associated with a second channel matrix, wherein the cross-correlation product between the first channel matrix and the second channel matrix is less than the cross-correlation product between the first channel matrix and any other channel matrix among the plurality of channel matrices.

4. The method of claim 2, wherein identifying the second pair of communication channels based on the comparing of the cross-correlation products includes:

determining, for the first communication channel, based on the comparing of the respective cross-correlation products, respective interference indicators indicative of interference on the first communication channel due to transmissions on respective ones of the other communication channels; and identifying, for the first communication channel, a second communication channel associated with a second channel matrix, wherein the interference indicator indicative of interference on the first communication channel due to transmissions on the second communication channel is less than any other interference indicator indicative of interference on the first communication channel due to transmissions on any other communication channel of the plurality of communication channels.

5. The method of claim 4, further comprising:

comparing the interference indicator corresponding to the first communication channel and the second communication channel to a threshold;

wherein selecting receivers associated with the identified one or more pairs of communication channels comprises selecting a first receiver associated with the first communication channel and a second receiver associated with the second communication channel to be included in the group of receivers, when the interference indicator is less than or equal to the threshold; and wherein the method further comprises transmitting data to the first receiver and to the second receiver in single user mode when the interference indicator exceeds the threshold.

6. The method of claim 2, wherein identifying the second pair of communication channels based on the comparing of the cross-correlation products includes:

determining, for the first communication channel, based on the respective cross-correlation products, respective signal to noise and interference (SINR) indicators indicative of SINR on the first communication channel in the presence of a transmission on respective ones of the other communication channels; and identifying, for the first communication channel, a second communication channel associated with a second channel matrix, wherein the SINR indicator corresponding to the first communication channel and the second communication channel is greater than any of the other SINR indicators corresponding to the first communication channel and any other communication channel.

7. The method of claim 6, further comprising:

comparing the cross-correlation product between the first communication channel and the second communication channel to a threshold;

wherein selecting receivers associated with the identified one or more pairs of communication channels comprises selecting a first receiver associated with the first communication channel and a second receiver associated with the second communication channel to be included in the group of receivers, when the cross-correlation product is less than or equal to the threshold; and wherein the method further comprises transmitting data to the first receiver and to the second receiver in single user mode when the cross-correlation product exceeds the threshold.

8. The method of claim 2, wherein identifying the second pair of communication channels based on the comparing of the cross-correlation products includes:

determining, for the first communication channel, based on the respective cross-correlation products between the first communication channel and each of the other communication channels, respective throughput indicators indicative of throughput on the first communication channel in the presence of a transmission on respective ones of the other communication channels; and identifying, for the first communication channel, a second communication channel associated with a second chan-

21 nel matrix, wherein the throughput indicator corresponding to the first communication channel and the second communication channel is greater than any of the other throughput indicators corresponding to the first communication channel and any other communication channel.

9. The method of claim 1, wherein identifying the first pair of communication channels based on the comparing of the cross-correlation products includes identifying, for a first communication channel of the first pair of communication channels, a second communication channel associated with a second channel matrix, including:
  determining, based on the cross-correlation products, respective cross-correlation metrics indicative of cross-correlation between each channel matrix and each of the one or more predetermined matrices;
  determining respective distances between the metric corresponding to the first communication channel and each other metric corresponding to each of the other communication channels; and
  identifying, as the second communication channel, a communication channel that corresponds to a greatest distance of the respective distances.

10. The method of claim 1, wherein cross-correlating each channel matrix with the one or more predetermined matrices to obtain respective cross-correlation products between each channel matrix and each of the one or more predetermined matrices includes using a first predetermined matrix for a first set of one or more subcarriers and using a second predetermined matrix for a second set of one or more subcarriers, wherein the second predetermined matrix is different than the first predetermined matrix.

11. The method of claim 1, wherein cross-correlating each channel matrix with the one or more predetermined matrices to obtain respective cross-correlation products between each channel matrix and each of the one or more predetermined matrices includes cross-correlating each channel matrix with a first predetermined matrix during a first period of time and cross-correlating each channel matrix with a second predetermined matrix during a second period of time, wherein the first predetermined matrix is different than the second predetermined matrix.

12. An apparatus comprising:
  a network interface device configured to:
    obtain descriptions of a plurality of communication channels, wherein obtaining the descriptions of the plurality of communication channels comprises obtaining a plurality of channel matrices associated with respective communication channels of the plurality of communication channels, wherein each communication channel is associated with a different one of a plurality of receivers, and wherein the plurality of receivers includes at least three receivers,
    identify, based on the descriptions of the plurality of communication channels, one or more pairs of communication channels, among the plurality of communication channels, that satisfy one or more predetermined constraints related to orthogonality between communication channels among the plurality of communication channels, including identifying a first pair of communication channels, wherein identifying the first pair of communication channels comprises:
      cross-correlating each channel matrix, of the plurality of channel matrices, with one or more predetermined matrices to obtain respective cross-correlation products between each channel matrix and each of the one or more predetermined matrices, wherein the

22 one or more predetermined matrices are one or more particular matrices other than the plurality of channel matrices, and each of the one or more predetermined matrices has the same number of elements as each channel matrix of the plurality of channel matrices,
      comparing ones of the cross-correlation products with others of the cross-correlation products, and
      identifying the first pair of communication channels based on the comparing of the cross-correlation products;
    wherein the network interface device is further configured to:
      select, to be included in a group of receivers, receivers associated with the identified one or more pairs of communication channels, and
      transmit, to the group of receivers, at least one data unit that includes data intended for each receiver in the group.

13. The apparatus of claim 12, wherein the network interface device is configured to:
  cross-correlate a first channel matrix, associated with a first communication channel of a second pair of communication channels, with each other channel matrix respectively associated with each other communication channel to obtain respective cross-correlation products between the first channel matrix and each of the other channel matrices;
  compare ones of the cross-correlation products with others of the cross-correlation products; and
  identify the second pair of communication channels based on the comparison of the cross-correlation products.

14. The apparatus of claim 13, wherein the network interface device is configured to identify, for the first communication channel, a second communication channel associated with a second channel matrix, wherein the cross-correlation product between the first channel matrix and the second channel matrix is less than the correlation product between the first channel matrix and any other channel matrix among the plurality of channel matrices.

15. The apparatus of claim 13, wherein the network interface device is configured to:
  determine, for the first communication channel, based on the comparison of the respective cross-correlation products, respective interference indicators indicative of interference on the first communication channel due to transmissions on each of the other communication channels; and
  identify, for the first communication channel, a second communication channel associated with a second channel matrix, wherein the interference indicator indicative of interference on the first communication channel due to transmissions on the second communication channel is less than any other interference indicator indicative of interference on the first communication channel due transmissions on any other communication channel of the plurality of communication channels.

16. The apparatus of claim 15, wherein the network interface device is further configured to:
  compare the interference indicator corresponding to the first communication channel and the second communication channel to a threshold:
  select a first receiver associated with the first communication channel and a second receiver associated with the second communication channel to be included in the group of receivers, when the interference indicator is less than or equal to the threshold; and transmit data to the first receiver and to the second receiver in single user mode when the interference indicator exceeds the threshold.

17. The apparatus of claim 13, wherein the network interface device is configured to:
  determine, for the first communication channel, based on the respective cross-correlation products, respective signal to noise and interference (SINR) indicators indicative of SINR on the first communication channel in the presence of a transmission on each of the other communication channels; and
  identify, for the first communication channel, a second communication channel associated with a second channel matrix, wherein the SINR indicator corresponding to the first communication channel and the second communication channel is greater than any of the other SINR indicators corresponding to the first communication channel and any other communication channel.

18. The apparatus of claim 17, wherein the network interface device is further configured to:
  compare the cross-correlation product between the first communication channel and the second communication channel to a threshold;
  select a first receiver associated with the first communication channel and a second receiver associated with the second communication channel to be included in the group of receivers, when the cross-correlation product is less than or equal to the threshold; and
  transmit data to the first receiver and to the second receiver in single user mode when the cross-correlation product exceeds the threshold.

19. The apparatus of claim 13, wherein the network interface device is configured to:
  determine, for the first communication channel, based on the respective cross-correlation products between the first communication channel and each of the other communication channels, respective throughput indicators indicative of throughput on the first communication channel in the presence of a transmission on each of the other communication channels; and
  identify, for the first communication channel, a second communication channel associated with a second channel matrix, wherein the throughput indicator corresponding to the first communication channel and the second communication channel is greater than any of the other throughput indicators corresponding to the first communication channel and any other communication channel.

20. The apparatus of claim 12, wherein the network interface device is configured to:
  determine, based on the cross-correlation products, respective cross-correlation metrics indicative of cross-correlation between each channel matrix and each of the one or more predetermined matrices;
  determine respective distances between a metric corresponding to a first communication channel of the first pair of communication channels and each other metric corresponding to each of the other communication channels; and
  identify, for the first communication channel, a second communication channel of the first pair of communication channels, wherein the second communication channel corresponds to a communication channel associated with a greatest distance of the respective distances.

21. The apparatus of claim 12, wherein the network interface device is configured to cross-correlate each channel matrix corresponding to a first set of one or more subcarriers with a first predetermined matrix and cross-correlate each channel matrix corresponding to a second set of one or more subcarriers with a second predetermined matrix, wherein the second predetermined matrix is different than the first predetermined matrix.

22. The apparatus of claim 12, wherein the network interface device is configured to cross-correlate each channel matrix with a first predetermined matrix during a first period of time and cross-correlate each channel matrix with a second predetermined matrix during a second period of time, wherein the first predetermined matrix is different than the second predetermined matrix.

* * * * *